May 2, 1967 C. VAN DER LELY 3,317,213
DEVICES FOR SPREADING GRANULAR OR POWDERY MATERIAL
Filed June 26, 1964 4 Sheets-Sheet 4
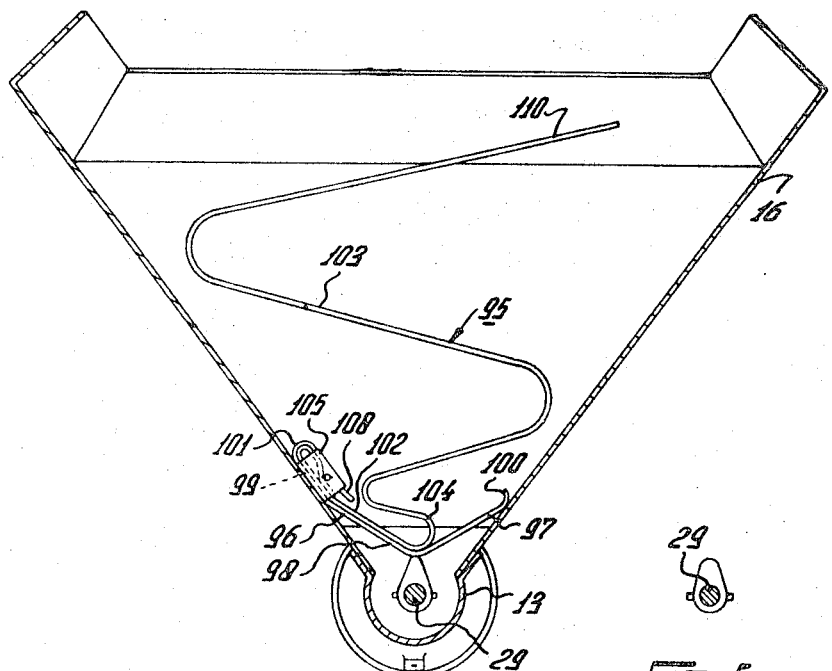
INVENTOR.
CORNELIS VAN DER LELY
BY
Mason, Mason & Albright
Attorneys

United States Patent Office 3,317,213
Patented May 2, 1967

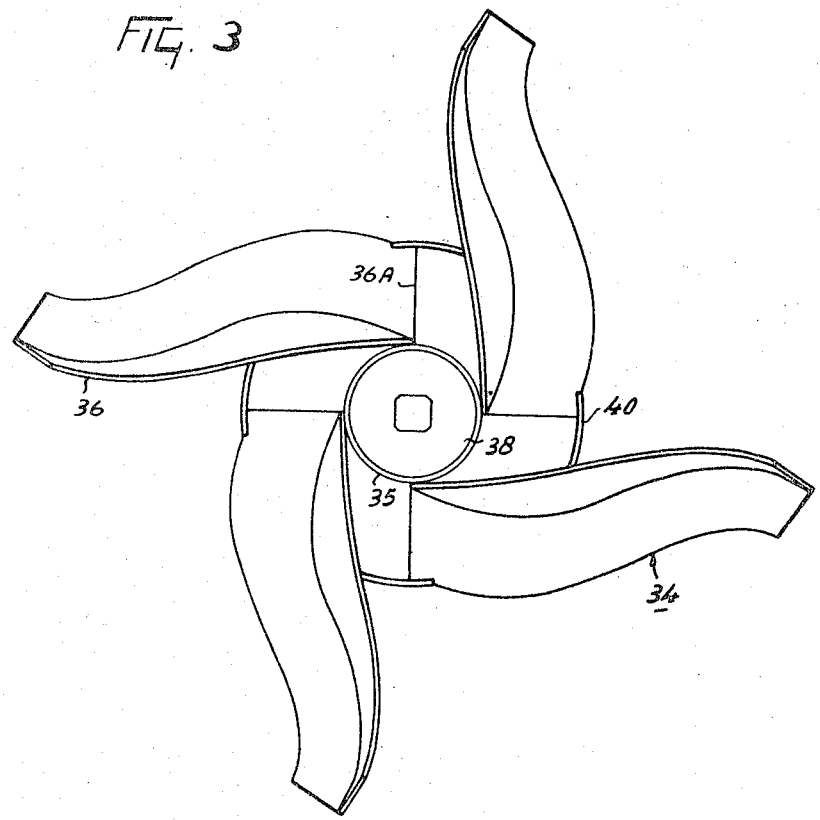

3,317,213
DEVICES FOR SPREADING GRANULAR OR POWDERY MATERIAL
Cornelis van der Lely, Zug, Switzerland, assignor to Patent Concern N.V., Willemstad, Netherlands Antilles, a limited-liability company of the Netherlands
Filed June 26, 1964, Ser. No. 378,159
Claims priority, application Netherlands, July 22, 1963, 295,633, 295,634
26 Claims. (Cl. 275—15)

The invention relates to a device for spreading granular or powdery material comprising a frame, a hopper for the material to be distributed and a distributor connected to a shaft to be driven during operation of the device, the hopper is provided with a delivery portion having an outlet port in a wall thereof and the material is fed from the hopper through the delivery portion to the distributor.

The invention has for its object inter alia to provide a device of the kind set forth, in which the wall provided with the outlet port can be satisfactorily arranged on the device and be readily adjusted.

With the device according to the invention the said wall is adapted to move around said shaft and to be fixed in a plurality of positions, while said wall is thicker near the shaft than at a given distance therefrom, and wherein the shaft is horizontal or substantially horizontal.

The invention relates further to a device for spreading granular or powdery material, comprising a frame, a hopper for the material to be spread and a distributor, the material being fed from the hopper to the distributor through at least one outlet port provided in a wall portion, said hopper comprising an agitator in its interior, wherein the agitator is formed by a helical element which extends horizontal or substantially horizontal and diverges at least over part of its length, so that a force is exerted on the material in the direction towards the outlet port.

With this construction an adequate supply of the material from the hopper to the outlet ports is ensured.

For a better understanding of the invention and to show how the same may be readily carried into effect, reference is made by way of example to the accompanying drawing, in which:

FIG. 3 is an elevation of the distributor, viewed in the direction of the arrow III in FIG. 1.

FIG. 4 is a sectional view of the device of FIGS. 1 and 2 taken on the line IV—IV in FIG. 2, the ejector disc not being shown.

FIG. 5 is an elevation of a further example of a lug driving the agitator of the device.

Figure 1:
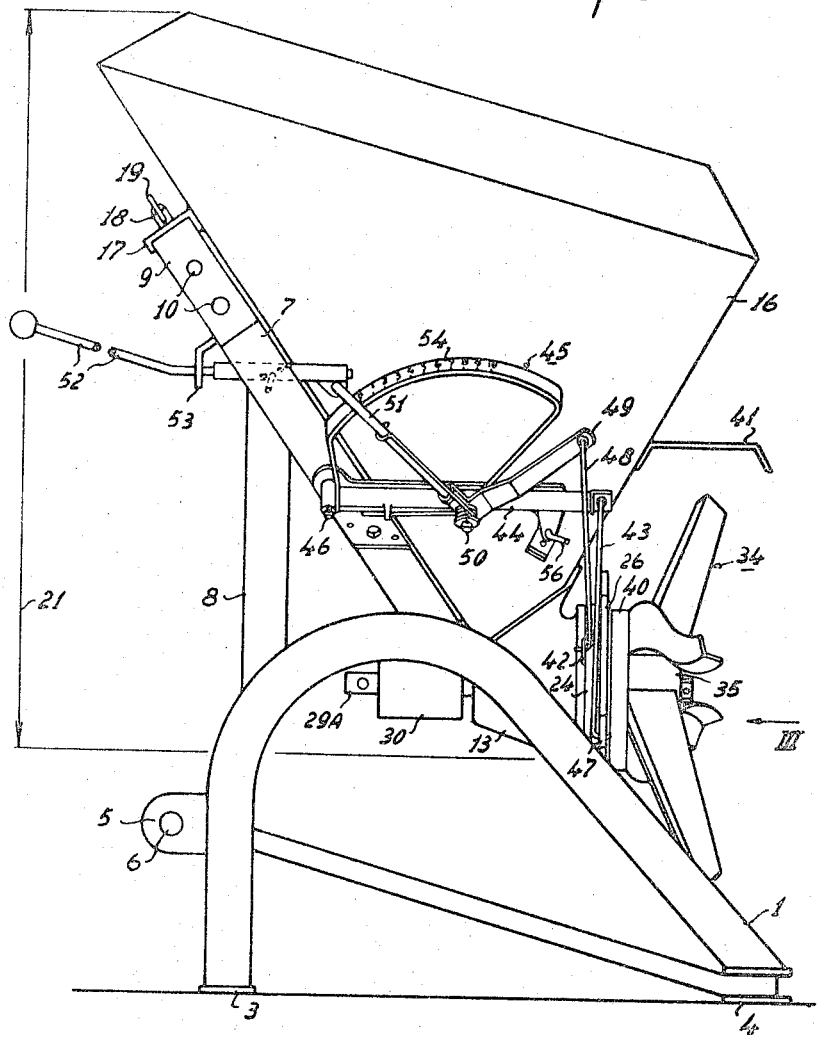
FIG. 1 is a side elevation of a device according to the invention.
Figure 2:
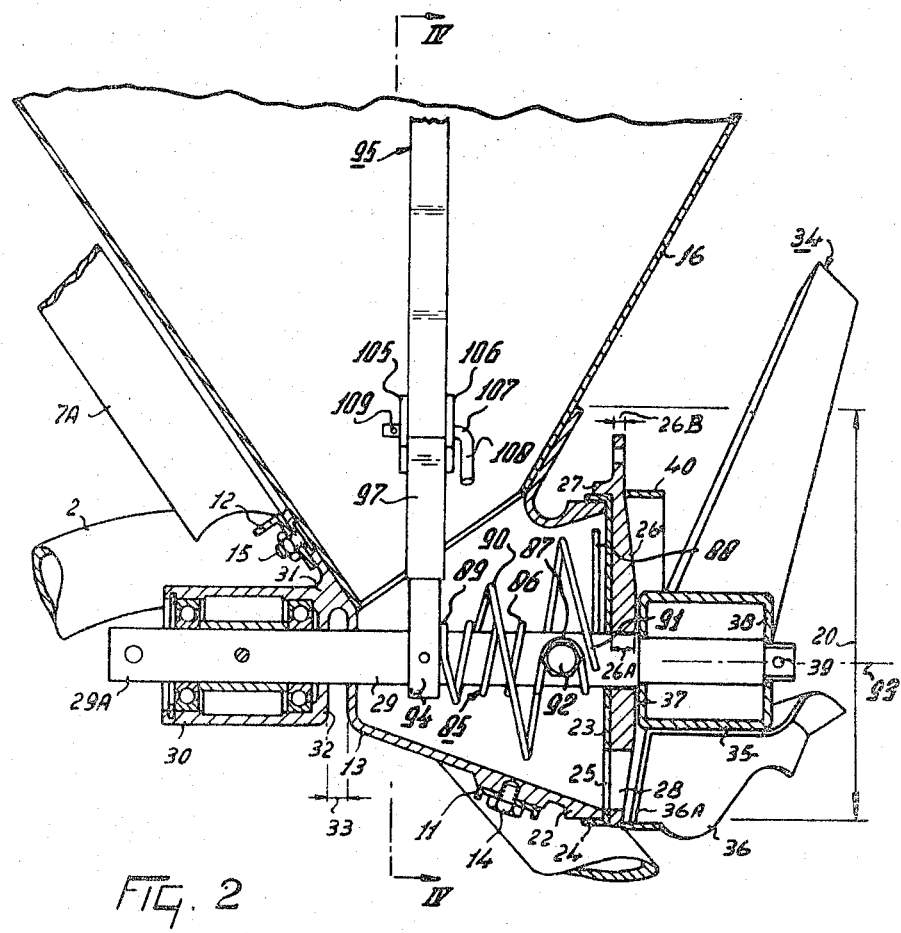
FIG. 2 is a sectional view of the device of FIG. 1 taken in a vertical plane extending in the direction of travel of the device and going through the center line of the shaft of the distributor.

The device comprises a frame which is completely symmetrical to the vertical plane going through the center line of the shaft of the distributor. On one side of the said vertical plane the device comprises a curved frame beam 1, which is shown in FIG. 1. The frame comprises furthermore a similarly curved beam 2, a small portion of which is shown in FIG. 2.

At the downwardly extending lower ends the frame beam 1 is provided with supporting plates 3 and 4 and the beam 2 is similarly provided with supporting plates. When it stands on the ground, the device is held by said supporting plates.

On the front side the frame beam 1 is provided with a tag 5 having a horizontal pin 6. The beam 2 is similarly provided with a tag and a pin. The frame beam 1 is provided with an oblique extending strip 7, the connection of which to the frame being stiffened by means of a strut 8. The upper end 9 of the strip 7 extends parallel to a vertical plane extending in the travelling direction and it is provided with two holes 10. The frame beam 2 is provided in the same manner with a strip 7A, which is shown partly in FIG. 2. The upper ends 9 of the strips 7 and 7A of the beams 1 and 2 are interconnected.

The frame beams 1 and 2 are interconnected by a channel-section beam 11 and a beam 12 formed by an angular-section iron, both beams extending horizontally. To the beams 11 and 12 is fastened a delivery part 13 of the hopper, which part forms at the same time the bottom side of the hopper. The delivery portion 13 is made of one piece of cast material, for example iron. By means of bolts 14 and 15 the delivery portion is fastened to the beams 11 and 12. The upper portion of the hopper is formed by a part 16, detachable from the frame and provided on the front side with a fastening member 17, which joins the upper ends of the strips 7. A pin 18, connected with the ends 9, is taken through a hole (not shown) of the hook-like fastening member 17 and a safety pin 19 is taken through the pin 18.

The delivery portion 13 has a height 20, which is smaller than one third of the over-all height 21 of the hopper. The delivery portion 13 is provided with a cylindrical rim 22, which is engaged by a wall 23 formed for example by a thin plate of stainless material (see FIG. 2). The wall 23 is circular and is provided with a bent-over rim 24, which fits around the cylindrical part 22 of the delivery portion 13. The wall 23 is provided with at least one opening 25. On the side of the wall 23 remote from the delivery portion 13 there is arranged a wall 26, which is also circular and is provided with a rim 27, which fits around the rim 24.

The wall 26 has at least one outlet port 28. The walls 26 and 23 are arranged on a shaft 29, which extends horizontally through the delivery portion 13 in the direction of travel of the device. The central part of the wall 26 has, near the shaft 29, a thickness 26A. On the outer circumference the wall 26 is thinner and it has a thickness 26B, which is approximately half of the thickness 26A. The wall 26 has a gradually decreasing thickness away from the central part towards its circumference. The side 26C of the wall 26 is perpendicular to the shaft 29 whereas the side 26D is conical shaped.

The shaft 29 is journalled on the front side of the delivery portion 13 in a bearing 30, which is made with the delivery portion 13 from a single piece of cast material. The bearing 30 is connected with the delivery portion 13 by means of connecting portion 31. The part 32, which comprises the bearings for the shaft 29, is located at a distance 33 from the front wall of the delivery portion 13.

On the rear side the shaft 29 has fastened to it a hub 35 of the distributor 34. The hub 35 is provided with spreading arms 36, which have a rim 36A at their other ends which is at right angles to the shaft 29 (FIG. 3). The spreading arms 36 join the hub 35 throughout their length and are secured thereto. The spreading member is provided with an annulus 37, which engages the wall 26, whilst the hub has an annulus 38 on the other side.

The end of the shaft 29 is provided with a safety pin 39, which prevents the hub 35 from shifting along the shaft 29. The distributor is provided with an annulus 40, which extends near the outer circumference of the wall 26 and which is connected with the spreading arms 36. Above the distributor the rear wall of the hopper part 16 is provided with a screening hood 41.

The wall 26 is connected by means of a bar 43 with an arm 44, which is adapted to turn about a shaft 46. The bar 43 is connected with a tag 47 of the wall 26. The arm 44 is associated with an adjusting mechanism 45, which comprises a further arm 49, which is adapted to turn about a shaft 50. The arm 49 is connected by means of a bar 48 with a tag 42 of the wall 23. The arm 49 is connected with a bar 51, the end of which is provided with a control arm 52. The arm 52 is journalled in a bearing 53, which is secured to the strip 7 of the frame beam 1.

Inside the delivery portion 13 of the hopper there is arranged a helical feeder 85, which is formed by an element of wound spring steel wire. The feeder 85 has a cylindrical portion 86 and a conical portion 90. The portion 90 diverges towards the wall 23. The axis of the cylindrical portion 86 and that of the conical portion 90 coincide with each other. The axis of the element 85 furthermore coincides with the center line 93 of the shaft 29. The cylindrical portion 86 surrounds the shaft 29 and has a portion 87, bent over through 180° and the cylindrical portion 86 is located on one side of the bend 87 and has a left-hand pitch, whereas it has a right-hand pitch on the other side of the bend. The cylindrical portion 86 has an end 88 which extends substantially parallel to the wall 23 and is located near the wall 23. Through a curved part 89 the cylindrical portion 86 terminates in the conical portion 90. The conical portion 90 diverges towards the wall 23 and has an end 91, which is located near the wall 23. The shaft 29 has a pin 92, by means of which the curve 87 of the cylindrical portion 86 is fastened to the shaft 29.

The shaft 29 is provided with a lug 94, which co-operates with an agitator 95 housed in the hopper portion 16 (See FIG. 4). The agitator 95 has, on the lower side, two portions 96 and 97 arranged in the form of a V, said portions being connected with each other by a curve 98. The ends 99 and 100 of the portions 96 and 97 are located on the hopper walls. The end 99 of the portion 96 is connected by a curved portion 101 with a portion 102, which is located at the side of the portion 96. The portion 102 terminates at the center of the agitator 95 through a bend 104 in a zigzag-shaped portion 103, the ends of which extend to the proximity of the side walls of the hopper so that the agitator extends substantially throughout the width of the hopper. The end 99 is located between two lugs 105 and 106, in which holes (not shown) are provided, through which a pin 107 is taken. The portions 99 and 102 are preferably clamped resiliently between the hopper wall and the pin 107. The pin 107 is provided at one end with a handle 108 and at the other end with a safety pin 109. The upper end of the agitator 95 is located near the upper side of the hopper.

The device operates as follows:

For use the device is coupled with a lifting device of a tractor or a similar vehicle, the pins 6 of the frame beams 1 and 2 being connected with the lowermost lifting arms. The upper ends 9 of the strips 7 constitute a fastening member, which can be attached to the topmost lifting arm of the lifting device. The foremost end 29A of the shaft 29 is provided with connecting means by which the shaft 29 can be coupled through an intermediate shaft with the power take-off shaft of the tractor. In order to spread material for example over a strip of land, the distributor is caused to rotate by the power take-off shaft of the tractor.

The walls 23 and 26 are adjusted relatively to each other so that the outlet ports 25 and 28 coincide at least partly, so that the material can be fed from the hopper part 16 through the delivery portion 13 to the spreading arms 36 of the distributor.

In order to ensure a satisfactory supply through the outlet ports the delivery portion 13 is provided with a feeder 85. The turns of the conical portion 90 are such that, when the element 85 is turned about the center line 93, the portion 90 exerts a force on the material in the direction towards the wall 23. The coils of the conical portion and of the cylindrical portion are chiefly in opposite senses. The element 85 is caused to rotate, since upon a turn of the shaft 29 the pin 92 arrives in the bend 87 so that the element 85 rotates with the shaft 29 with the same speed as the distributor 34.

When the shaft 29 rotates, the lug 94 is caused to perform an intermittent movement with the lower side of the agitator 95, while the lug 94 comes into contact with the portion 98 of the agitator. The agitator 95 is made of resilient strip material and the lowermost V-shaped portion has a shape such that its ends 99 and 100 engage the hopper wall under a slight stress, when it is not in contact with the lug 94. The lug 94 thus causes the agitator to perform an upward and downward movement.

The agitator 95 can be easily removed from the arranged in the hopper by removing and inserting respectively the pin 107. The pin 107 is prevented from getting loose by the safety pin 109. In this way the agitator 95 can be readily removed from the hopper when material is to be spread, which does not or substantially not tend to cake in the hopper.

The ends 88 and 91 of the feeder 85 located near the wall 23 prevent the material from sticking to the wall 23 so that a constant, adequate flow of material from the hopper through the delivery portion to the outlet ports 25 and 28 is ensured.

In order to regulate the quantity of material to be delivered per unit time, the wall 23 can be adjusted relatively to the wall 26 and be fixed in a plurality of positions. The wall 23 thus constitutes a closing member for regulating the size of the outlet port 28. For adjusting the wall 23 of the control-arm 52 can be shifted in the bearing 53 so that the arm 49 turns around the shaft 50 and the bar 48 turns the wall 23 around the shaft 29. The position of the wall 23 relative to the wall 26 can be read from the dial 54, along which the bar 51 is adapted to move, and to be fixed in a plurality of positions along the dial 54; this is not shown in detail. The place where the material is fed to the spreading arms can be varied by displacing, in common, the walls 23 and 26. To this end the arm 44 of the adjusting mechanism 45 can be turned about the shaft 46 and be fixed by means of a pin 56 in a plurality of positions. By varying the place where the material is fed to the spreading arms the direction of spreading of the material can also be affected.

By making the wall 26 thicker near the shaft 29 than near its circumference, a satisfactory seat on the shaft 29 is obtained. The wall 26 has a shape such that its side facing the delivery portion 13 is at right angles to the shaft 29, whereas the other side is slightly conical. In this manner the delivery of material to the spreading arms 36 will, in many cases, be improved.

Since the lower part of the hopper consists of a small delivery portion of cast material, this portion can be machined simply with great accuracy during the manufacture of the device, so that the relatively movable and interconnected parts can be arranged with satisfactory fit.

Since the bearing 30 is located at a distance 33 from the front wall of the delivery portion, any material emanating from the hopper along the shaft 29 will not penetrate into the bearing 30.

FIG. 5 shows a lug 111, which has a further rounded-off, eccentrical portion 112. The lug 111 can be fastened to the shaft 29 in the same manner as the lug 94. When the lug 111 is employed, the agitator 95 will move more smoothly upwards and downwards than with the use of the lug 94.

What I claim is:

1. A device for spreading granular or powdery material comprising a frame, a hopper for the material to be spread and a distributor, a substantially horizontal drive shaft for said distributor, said hopper having a delivery portion including a wall and an outlet port in said wall, said wall being substantially perpendicular to said shaft and being conical-shaped at its surface projecting to said distributor, said distributor being provided with spreading arms having inner ends, each of said inner ends being provided with a rim radially projecting relative to said shaft, said rims extending parallel to and adjoining said conical surface of said wall.

2. A device of claim 1 wherein the thickness of said wall decreases in radial direction from said shaft, the surface of said wall projection to said delivery portion being perpendicular to said drive shaft.

3. A device of claim 1 wherein said wall is movable about said shaft relative to said delivery portion, an adjusting mechanism being secured to the frame and being coupled with said wall for moving same selectively into a plurality of positions relative to said delivery portion.

4. A device for spreading granular or powdery material comprising a frame, a hopper for the material to be spread and a distributor, a substantially horizontal drive shaft for said distributor, said hopper having a delivery portion including a wall and an outlet port in said wall, said wall being movable about said shaft and fixable in a plurality of positions, said wall being thicker near said shaft than at a given distance therefrom, said wall co-operating with a second wall and said second wall being a relative thin plate that is also movable about said shaft relative to said first wall, said walls being substantially coextensive relative to one another, an adjusting mechanism being secured to the frame, said mechanism being coupled to said first and second walls for moving said walls into a plurality of positions on said shaft relative to said delivery portion.

5. The device of claim 4 wherein the hopper includes an upper part that is detachably connected to the delivery portion, said delivery portion including a bearing for said drive shaft and being secured to the frame.

6. The device of claim 4 wherein the adjusting mechanism includes a control arm connected to said second wall for adjusting same relative to said first-named wall.

7. The device of claim 5 wherein the bearing is located on one side of the delivery portion a given distance from the hopper and the distributor is located on the opposite side of said delivery portion.

8. The device of claim 5 wherein the shaft includes coupling means for connection to a power take-off shaft.

9. The device of claim 6 wherein the adjusting mechanism includes control means associated with said first-named wall whereby said walls can each be adjusted relative to said delivery portion and to one another.

10. The device of claim 4 wherein the element is a spring that at least partly surrounds the shaft.

11. The device of claim 10 wherein the spring includes a cylindrical portion and a conical portion and the portions have a common axis.

12. The device of claim 11 wherein the portions and the shaft have a common axis.

13. The device of claim 11 wherein an end of said cylindrical portion and an end of said conical portion extend substantially parallel to said wall.

14. The device of claim 11 wherein the cylindrical portion is provided with a curved portion and the shaft includes a pin, during operation of the device said curved portion embracing said pin freely whereby rotation of said shaft rotates the spring.

15. The device of claim 4 wherein a second agitator is resiliently secured to the hopper and the shaft is provided with a lug that cooperates with said second agitator.

16. The device of claim 15 wherein the second agitator is an upwardly extending zigzag-shaped member which extends substantially across the width of the hopper.

17. The device of claim 15 wherein the lower part of the second agitator is provided with a V-shaped portion, locking lug means including a locking pin attached to the hopper and said V-shaped portion being secured to said lug means.

18. The device of claim 17 wherein the V-shaped portion has upwardly extending limbs with ends that engage the hopper.

19. The device of claim 18 wherein the end of one of the limbs is provided with a bent-over part which is engaged by the lug means on the hopper and is clamped resiliently between the hopper and the locking pin.

20. The device of claim 4 wherein said delivery portion includes an agitator, said agitator comprising a helical element extending substantially horizontally and surrounding said shaft, said agitator diverging over at least part of its length toward said wall whereby a force is exerted to urge the material toward said outlet port.

21. The device of claim 4 wherein the thickness of the wall decreases in a radial direction from said shaft.

22. The device of claim 4 wherein said wall is located adjacent the distributor, said distributor being provided with spreading arms whose ends are connected by a hub on said shaft.

23. The device of claim 22 wherein the distributor is provided with an annulus located near the outer periphery of the wall, said annulus being connected to the spreading arms.

24. The device of claim 4 wherein the walls are in engagement and the second wall is located on the side of the hopper.

25. The device of claim 4 wherein the second wall has a rim around its outer periphery, said rim being concentric to said shaft and engaging the outer surface of the delivery portion.

26. The device of claim 25 wherein the first-named wall has a rim that engages the rim of said second wall.

References Cited by the Examiner

UNITED STATES PATENTS

| | | | |
|---|---|---|---|
| 587,374 | 8/1897 | Rickey | 275—12 |
| 883,564 | 8/1908 | Parrish | 275—8 |
| 1,836,537 | 12/1931 | Lawrence | 222—231 |
| 2,253,945 | 8/1941 | Starrett | 222—233 X |
| 2,543,586 | 2/1951 | Nabors | 275—8 |
| 3,239,231 | 3/1966 | Van Der Lely et al. | 275—15 |

FOREIGN PATENTS

| | | |
|---|---|---|
| 96,144 | 6/1963 | Denmark. |
| 627,563 | 10/1927 | France. |
| 1,118,099 | 1/1955 | France. |
| 1,278,374 | 1/1961 | France. |
| 255,359 | 7/1926 | Great Britain. |

ABRAHAM G. STONE, *Primary Examiner.*

J. R. OAKS, *Assistant Examiner.*